United States Patent
Watanabe et al.

(10) Patent No.: US 6,915,917 B2
(45) Date of Patent: Jul. 12, 2005

(54) HEAT INSULATING CONTAINER AND ITS MANUFACTURING METHOD

(75) Inventors: Isao Watanabe, Tokyo (JP); Takafumi Fujii, Tokyo (JP); Naoho Baba, Tokyo (JP)

(73) Assignee: Thermos K.K., Niigata-Ken (JP)

( * ) Notice: Subject to any disclaimer, the term of this patent is extended or adjusted under 35 U.S.C. 154(b) by 190 days.

(21) Appl. No.: 10/405,963

(22) Filed: Apr. 1, 2003

(65) Prior Publication Data

US 2003/0189054 A1 Oct. 9, 2003

(30) Foreign Application Priority Data

Apr. 8, 2002 (JP) ........................................ 2002-105630

(51) Int. Cl.$^7$ ........................ B65D 81/38; B65D 83/72; A47J 39/00; A47J 47/00
(52) U.S. Cl. ................ 215/13.1; 215/12.1; 220/592.21; 220/592.27
(58) Field of Search .............................. 215/12.1, 12.2, 215/13.1; 220/592.2, 592.21, 592.27, 62.15

(56) References Cited

U.S. PATENT DOCUMENTS

| | | | | |
|---|---|---|---|---|
| 1,549,743 A | * | 8/1925 | Bultman et al. ........... 215/12.1 |
| 2,057,969 A | * | 10/1936 | Duevel, Jr. et al. ........ 215/12.1 |
| 2,725,733 A | * | 12/1955 | Davis ........................ 215/12.1 |
| 3,261,491 A | * | 7/1966 | Bramming ................. 215/12.1 |
| 4,233,957 A | * | 11/1980 | Kenny ........................ 126/652 |
| 4,560,075 A | * | 12/1985 | Lu ............................. 215/12.2 |
| 4,856,174 A | * | 8/1989 | Ishizaki et al. ............. 29/455.1 |
| 5,168,793 A | * | 12/1992 | Padamsee .................... 99/279 |
| 5,721,027 A | * | 2/1998 | Frisk et al. ................. 428/35.4 |
| 6,179,155 B1 | * | 1/2001 | Komiya et al. ........ 220/592.11 |
| 6,180,191 B1 | * | 1/2001 | Felts ........................... 427/569 |
| 6,371,328 B1 | * | 4/2002 | Yamada et al. .......... 220/592.2 |

FOREIGN PATENT DOCUMENTS

GB        2171118 A  *  8/1986  ........... C23C/28/04

* cited by examiner

Primary Examiner—Sue A. Weaver

(57) ABSTRACT

A heat insulating container and its manufacturing method is provided. The heat insulating container comprises an inner container and an outer glass container, in which the breakage of the glass containers can be prevented even if a minute flaw is formed on either of the glass containers. The insulating container possesses a superior radiant heat insulating capability. The inner glass container is housed in the outer glass container with a gap in between, which air-gap functions as a heat insulating layer. A radiant heat preventive film containing metal oxide is provided at least either on the outer surface of the inner glass container or on the inner surface of the outer glass container with an intermediate film containing $SiO_2$ in between.

6 Claims, 3 Drawing Sheets

HEAT INSULATING CONTAINER AND ITS MANUFACTURING METHOD

CROSS-REFERENCE TO RELATED APPLICATION

This application claims the priority benefit of Japanese application serial no.2002-105630, filed on Apr. 8, 2002.

BACKGROUND OF THE INVENTION

1. Field of the Invention

This invention relates in general to a heat insulating container and its manufacturing method, and more particularly to a heat insulating container having an inner glass container and an outer glass container.

2. Description of the Related Art

A heat insulating container comprising an inner glass container and an outer glass container has been in common use. The heat insulating container has a structure comprising an inner glass container is housed in an outer glass container with a gap formed between the inner and the outer glass containers. In this heat insulating container, the gap is a vacuum, or a low heat conductive gas (for example, argon, krypton, xenon) having a heat conductivity smaller than that of air is sealed within the gap, so that the gap constitutes a heat insulating layer. In this type of heat insulating container, a radiant heat preventive film is formed on an outer surface of the inner glass container and the inner surface of the outer glass container, wherein the radiant heat preventive film comprises silver and the like.

To manufacture thebove heat insulating container, for example, the following method may be adopted. The inner glass container and the outer glass container are integrally joined together on the ends of an opening. Next, a silver solution is injected into the gap such that the silver solution gets adhered to prescribed surfaces of the inner and outer glass container. Next, the resulting structure is heated at a temperature of about 200° C. to form a silver film. Subsequently, the gap is made vacuum by exhausting the gap of air through a tip tube provided on the outer container. Otherwise, a low heat conductivity gas is sealed within the gap. In both cases, the gap is transformed into a heat insulating layer.

Japanese Laid Open Publication No. 2001-505088 discloses a heat insulating container, in which a radiant heat preventive film made of metal oxide ($SnO_2$, $InO_3$, ZnO, etc.) with a resistivity of $10^{-4}$ Ω.cm is formed on the surfaces of the inner glass container and an outer glass container. The heat insulating container disclosed in thebove publication has an advantage that the contents of the container can be visible because the radiant heat preventive film is highly transparent.

Thebove radiant heat preventive film can be formed by using a sol-gel method which is described as follows. A metal complex solution is introduced into the gap such that the metal complex solution gets adhered to the prescribed surfaces of the inner and the outer glass containers. After that, the metal complex is dried under a heat treatment so that a metal oxide film is formed. For enhancing radiant heat insulating capability, the metal oxide film is reduced by subjecting it to a heat treatment, for example, by annealing at a temperature of about 400 to 600° C. in a reducing atmosphere, such as, in vacuum. Thus, the radiant heat preventive film made of metal oxide is obtained.

In thebove process, however, the thermal expansion coefficient of the inner and the outer glass containers differs widely from that of the radiant heat preventive film made of metal oxide. As a result, the shrinkage volume of the inner and the outer glass containers becomes widely different from that of the radiant heat preventive film when the heat insulating container is cooled down after thebove heat treatment. This shrinkage volume difference may cause an internal stress in the inner and outer glass containers. The stress resulting from the shrinkage of the radiant heat preventive film made of metal oxide is so strong that, for example, if a metal oxide film is formed on the surface of a thin-plated glass, the stress caused by the shrinkage of the metal oxide film could bend the thin-plated glass into a U-shape.

Besides, when the inner and the outer glass containers of above heat insulating container are manufactured (molded or transferred), a minute flaw such as crack and the like of several tens of nanometers to a few micrometer deep may be formed on the surface of the inner and outer glass containers. As a result, when the heat insulating container is cooled down after the heat treatment, the internal stress caused by thebove shrinkage volume difference becomes more concentrated on the flaw, which makes the inner and outer glass containers to easily break up from the flaw. Also, when the contents having a high temperature, such as hot water, is stored in the heat insulating container with such a flaw, an internal stress caused by thermal expansion acts on the flaw, causing the inner and outer glass containers, particularly the inner glass container, to easily break up.

Furthermore, when a glass containing a large amount of metal ions, such as soda glass, is used as the material making the inner and the outer glass containers, the metal ion (Na ion, K ion, Mg ion, etc.) may diffuse, and migrate into the radiant heat preventive film. In such a case, the resistivity of the radiant heat preventive film increases, while its carrier concentration decreases. As a result, the radiant heat preventive capacity of the radiant heat preventive film deteriorates. Yet another problem is that the radiant heat preventive film of a conventional heat insulating container (vacuum bottle) is made of silver, whose heat conductivity is high, which causes the conventional heat insulating container to lose part of its thermal insulating capability. This is because that when the radiant heat preventive film is provided near the end of the opening of the conventional heat insulating container, the heat in the container is transmitted through the radiant heat preventive film, allowing the heat to escape to outside due to the high heat conductivity of the radiant heat preventive film.

SUMMARY OF THE INVENTION

Accordingly in the light of the foregoing description, it is an object of this invention to provide a heat insulating container and its manufacturing method, wherein the heat insulating container can prevent the inner and the outer glass containers from breaking up, even if either of glass containers has a flaw, and possesses a superior radiant heat preventive capability.

The heat insulating container of the present invention is provided with a radiant heat preventive film containing metal oxide. The heat preventive film is formed on at least either of the outer surface of an inner glass container or on an inner surface of an outer glass container having an intermediate film containing $SiO_2$ formed thereon. The intermediate film is preferably formed by a sol-gel method. It is also preferable that the radiant heat preventive film is composed of more than one or more than one compounds selected from a group consisting of $In_2O_3$—$SnO_2$ $Sb_2O_3$—

$SnO_2$, $In_2O_3$—ZnO, $Al_2O_3$—ZnO, $GaO_2$—ZnO, $F_2$—$SnO_2$, $F_2$—ZnO. It is also desirable that the intermediate film and the radiant heat preventive film are at least formed on the outer surface of the inner glass container. The softening temperature of the glass constituting the inner and the outer glass containers is preferably more than 500 degree. The inner and the outer glass containers may be composed of soda glass, borosilicate glass or the like. It is desirable to form a gap in an airtight manner.

The manufacturing method of the heat insulating container of the present invention is described as follows. The inner glass container is housed in the outer glass container with a gap formed in-between the inner and the outer glass containers, and both containers are joined together. Next, an intermediate film material is adhered to at least either of the outer surface of the inner glass container or the inner surface of the outer glass container, and is subjected to a heat treatment to form the intermediate film. Preferably, the intermediate film is comprised of silicon dioxide ($SiO_2$) The intermediate film is then provided with a radiant heat preventive film containing metal oxide on its surface and is subjected to a heat treatment. Thus, the radiant heat preventive film containing metal oxide is formed.

BRIEF DESCRIPTION OF THE DRAWINGS

While the specification concludes with claims particularly pointing out and distinctly claiming the subject matter which is regarded as the invention, the objects and features of the invention and further objects, features and advantages thereof will be better understood from the following description taken in connection with the accompanying drawings in which:

DESCRIPTION OF THE PREFERRED EMBODIMENT

The heat insulating container of the present invention is provided with a radiant heat preventive film containing metal oxide. The heat preventive film is formed on at least either of the outer surface of an inner glass container or the inner surface of an outer glass container over an intermediate film containing $SiO_2$. Besides $SiO_2$ intermediate film containing a component other than $SiO_2$ can also be used. The intermediate film may be formed using, for example, a sol-gel method, a vapor deposition method, or a sputtering method. Particularly, the sol-gel method is most preferable. It is preferable that the radiant heat preventive film is composed of more than one or more than one compounds selected from a group consisting of $In_2O_3$—$SnO_2$, $Sb_2O_3$—$SnO_2$, $In_2O_3$—ZnO, $Al_2O_3$—ZnO, $GaO_2$—ZnO, $F_2$—$SnO_2$, $F_2$—ZnO. It is also desirable that the intermediate film and the radiant heat preventive film are at least formed on the outer surface of the inner glass container. The softening temperature of the glass constituting the inner and the outer glass containers is preferably more than 500° C. The inner and the outer glass containers are composed of soda glass, borosilicate glass or the like. It is desirable to form a gap in an airtight manner.

Figure 1:
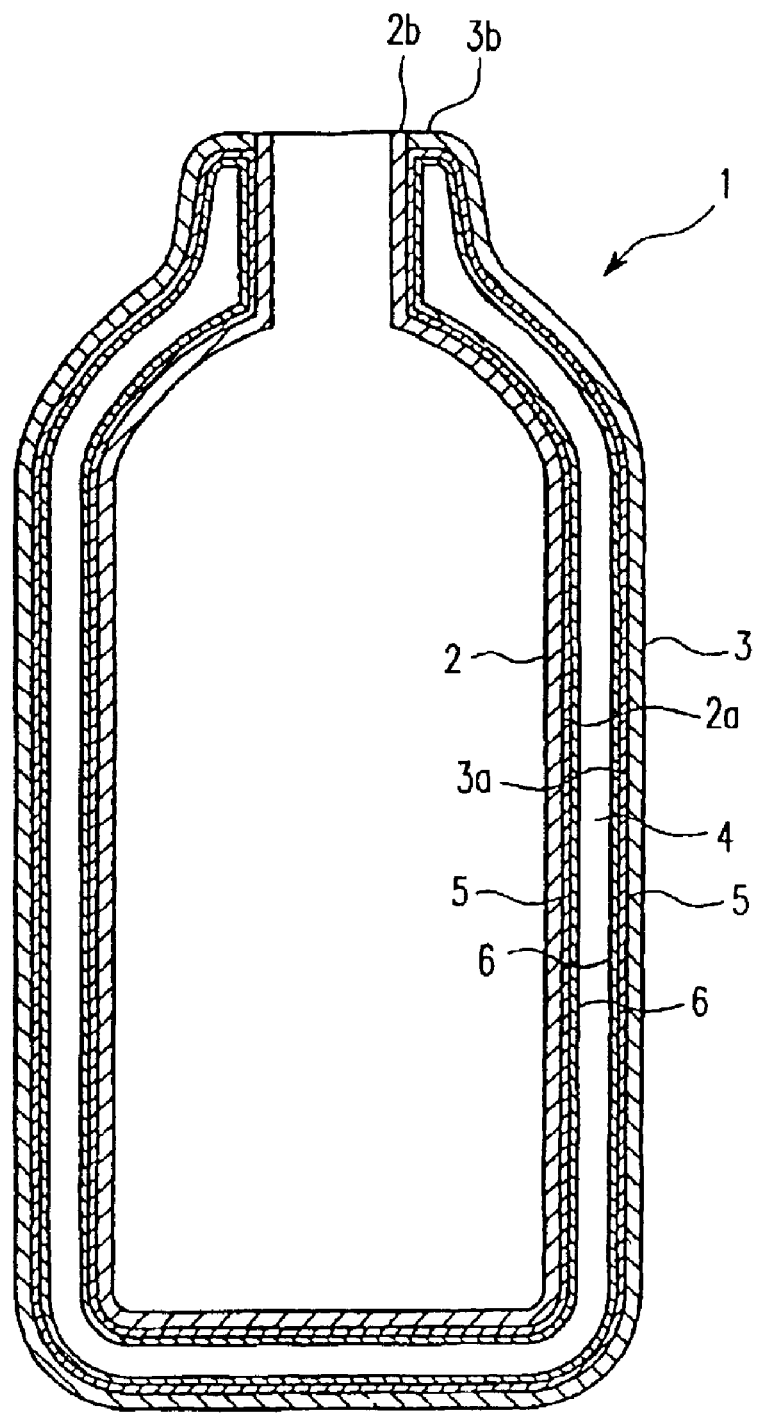
FIG. 1 is a sectional view showing one embodiment of the heat insulating container of the present invention.
Figure 2:
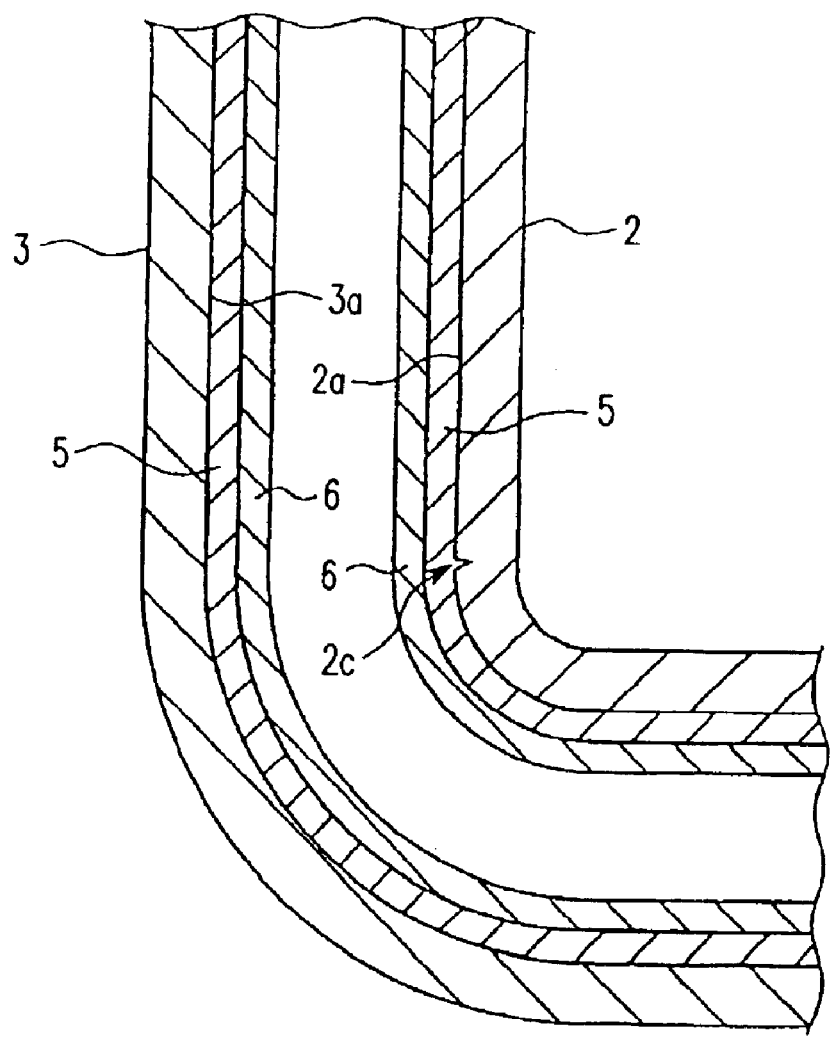
FIG. 2 is an enlarged sectional view of an important element of the heat insulating container shown in FIG. 1.

Referring to FIG. 1 and FIG. 2, the heat insulating container 1 of the present invention comprises an inner glass container 2 which is housed in an outer glass container 3 with a gap 4 formed there in-between. The material of the inner glass container 2 and the outer glass container 3 is comprised of soda-lime glass (soda glass), borosilicate glass, quartz glass and the like. Particularly, soda glass is inexpensive and preferable. It is preferable to use a glass with a softening temperature of more than 500° C. to constitute the inner and the outer glass containers 2 and 3. To raise the softening temperature of glass (soda glass and the like) up to above 500° C., it is desirable that the glass contain components such as $B_2O_3$, $Al_2O_3$ and the like, of a prescribed concentration. If the softening temperature is lower than 500° C., the inner and the outer glass containers 2, 3 soften and become deformed when an intermediate film 5 and a radiant heat preventive film 6 are formed, possibly hampering the manufacturing of the intermediate film 5 and the radiant heat preventive film 6. The inner glass container 2 and the outer glass container 3 are joined together on respective opening ends 2b, 3b, integrally formed, wherein both containers are preferably joined in an airtight manner to make the gap 4 airtight.

Both the outer surface 2a of the inner glass container 2 and the inner surface 3a of the outer glass container 3 are provided with the radiant heat preventive film 6 with the intermediate film 5 between the respective surfaces 2a and 3a and the heat radiant heat preventive film 6. That is, the intermediate film 5 is formed on the outer surface 2a and the inner surface 3a first, on which the radiant heat preventive film 6 is formed. The intermediate film 5 is made of the material comprising $SiO_2$ and preferably has a thickness of more than 50 nm. A flaw may occur on the inner glass container 2 or the outer glass container 3, and usually reach several tens of nanometers to several hundred nanometers deep. Therefore, the intermediate film 5 is required to be thick enough to compensate the flaw. However, forming a thick intermediate film 5 in one-step process may make the intermediate film 5 non-uniform in its thickness or easy to crack. Accordingly, it is desirable to form the intermediate film 5 by sequentially forming a plurality of thin films, for example, with each film with a thickness of several tens of nanometers,. Accordingly, the thickness of the intermediate film 5 is determined with a consideration of the depth of the flaw and a scheme of controlling the uniformity of the thickness of the intermediate film 5 by way of sequentially forming a plurality thin films. It is preferable that the thickness of the intermediate layer 5 is about 100 nm to 500 nm. The radiant heat preventive film 6 is made of a material containing metal oxide. The material of the radiant heat preventive film 6 is preferably composed of more than one or more than one compounds selected from a group consisting of ITO ($In_2O_3$—$SnO_2$), ATO ($Sb_2O_3$—$SnO_2$), IZO ($In_2O_3$—ZnO), AZO ($Al_2O_3$—ZnO), ZGO ($GaO_2$—ZnO), FTO ($F_2$—$SnO_2$), FZO ($F_2$—ZnO). It is also desirable that the thickness of the radiant heat preventive film 6 is about 150 nm to 500 nm.

Figure 3:
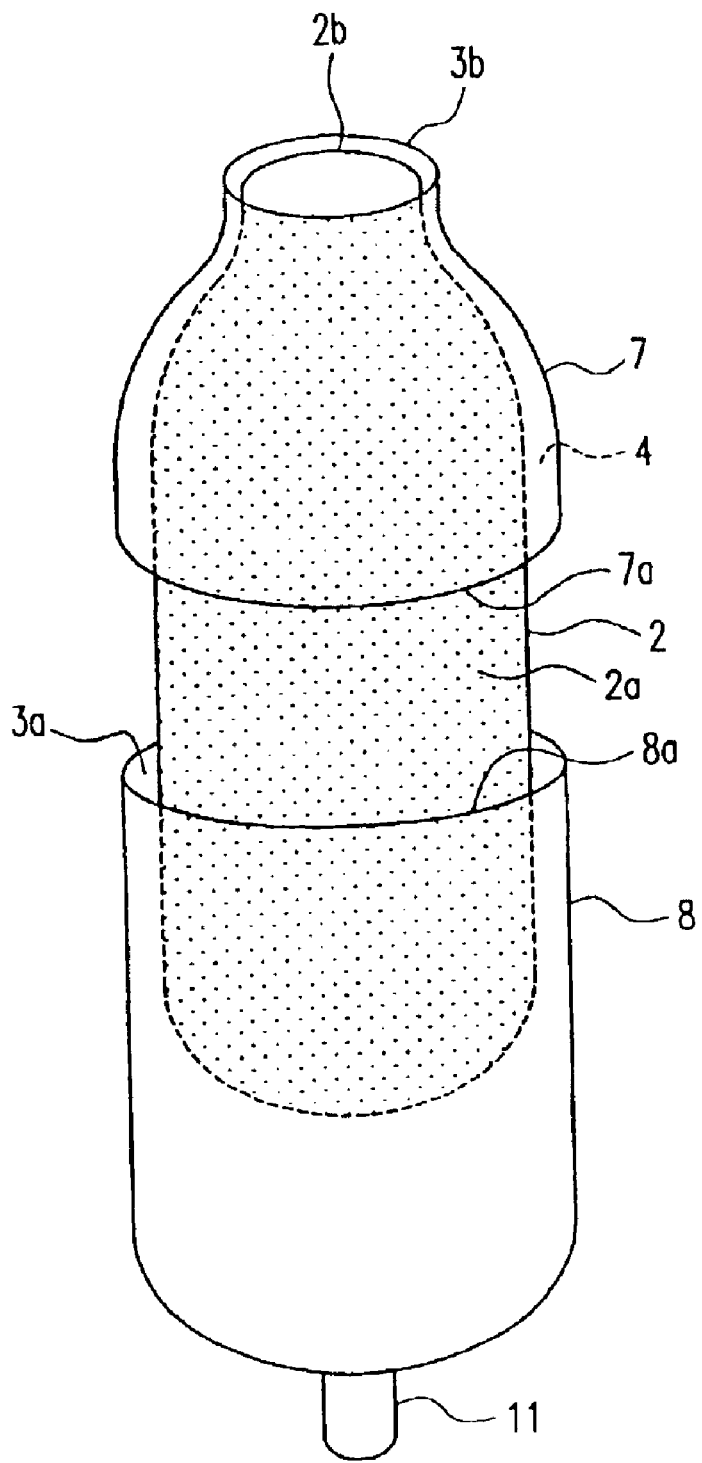
FIG. 3 is a drawing illustrating the manufacture of the heat insulating container shown in FIG. 1.

One example of the manufacturing method of the heat insulating container of the present invention is described referring to FIG. 3. An upper outer container 7 constituting an upper part of the outer glass container 3, a lower outer container 8 constituting the lower part of the outer glass container 3 and the inner container 2 are provided. On a bottom of the lower outer container 8, an exhausting tip tube 11 for exhausting the gap 4 is provided. The upper part of the inner glass container 2 is housed in the upper outer container 7, and the opening end 3b of the upper outer container 7 and the opening end 2b of the inner glass container 2 are melted together to be fused in an airtight manner. Then, the lower outer container 8 is arranged in such a way that the lower outer container 8 covers the lower part of the inner glass container 2, wherein the lower end 7a of the upper outer container 7 and the upper end 8a of the lower outer container 8 are melted together to be fused in an airtight manner. It will be appreciated that an adjusting pad can be arranged between the upper and lower outer containers 7, 8 and the inner glass container 2, the pad having a prescribed thickness equal to the width of the gap formed by both outer and inner glass containers. In this manner, a double-wall container in which the inner glass container 2 is housed in the outer glass container 3 with the gap 4 formed in-between the inner glass container 2 and the outer glass container 3 is obtained.

Following the manufacture of the double-wall container, the intermediate film 5 is formed on the outer surface 2a of the inner glass container 2 and the inner surface 3a of the outer glass container 3. Hereinafter, a method of forming the intermediate film 5 using the sol-gel method is described. First, an intermediate film material solution, comprising the following composition, is prepared.

$Si(OC_2H_5)_4$: 28.9 wt %

$C_2H_5OH$: 43.5 wt %

HCl: 0.003 wt %

$H_2O$: 27.2 wt %

Thebove intermediate film material solution is injected into the gap 4 through the exhausting tip tube 11 such that the intermediate material solution is adhered to the whole of the outer surface 2a of the inner glass container 2 and the whole of the inner surface 3a of the outer glass container 3. Excess portion of the intermediate film material solution is discharged through the exhausting tip tube 11. Then, the double-wall container is heated in order to vaporize the solvent, such as $C_2H_5OH$, in the intermediate film material solution. The vaporized solvent is discharged from the exhausting tip tube 11.

When a flaw is formed on the surface of the inner glass container 2 or the outer glass container 3, the flaw is filled with the intermediate film material. For example, when a flaw 2c, which is a crack, is formed on the outer surface 2a of the inner glass container 2, as shown in FIG. 2, the flaw 2c is filled with the intermediate film material.

It will be appreciated that the thickness of the intermediate film 5 can be controlled to a desirable thickness by properly adjusting the concentration of $Si(OC_2H_5)_4$, in the intermediate film material solution and/or adjusting the frequency of supply of thebove material solution until an intermediate film 5 of desired thickness is formed. It is preferable to set thebove thickness according to the dimension (depth, etc.) of the flaw formed on the inner glass container 2 or the outer glass container 3. For example, when the intermediate film material solution with theforementioned composition is used, the intermediate film 5 with a thickness of 0.1 to 0.5 $\mu$m is formed when thebove material solution is injected once. Therefore, if the maximum depth of the flaw is around 1 $\mu$m, it is preferable that the intermediate film material solution injected repeatedly several times so that the flaw is filled with the intermediate film material without fail.

Next, the double-wall container is subjected to a heat treatment, preferably annealing at a temperature range of about 300 to 600° C. If thennealing temperature does not reach thebove range, the reaction of the intermediate film material solution ($Si(OC_2H_5)_4$) will become insufficient, raising a concern of a weak adherence of the intermediate film 5 to the inner and the outer glass containers 2 and 3. Meanwhile, if the heat temperature is over thebove range, the cost of heat treatment will increase. In addition, such an annealing temperature may surpass the heat-resistant temperature of the inner and the outer glass containers 2 and 3. Therefore, the heat temperature beyond the range is not desirable. Under the heat treatment, $Si(OC_2H_5)_4$ of the intermediate film material is dried, and the intermediate film 5 containing $SiO_2$ is formed on the outer surface 2a of the inner glass container 2 and the inner surface 3a of the outer glass container 3. It is desirable that the completion of solvent removal and thermal drying is confirmed based on the result of prior observations carried out beforehand.

Next, the radiant heat preventive film 6 is formed on the intermediate film 5. Accordingly, a description is made of a method for forming the radiant heat preventive film 6 composed of ITO ($In_2O_3$—$SnO_2$) using the sol-gel method as follows. First, a radiant heat preventive film material solution comprising the following composition is prepared.

acetylacetone: 10 wt % isopropyl alcohol: 25 wt % ethanol: 25 wt % propylene glycol: 30 wt % metal (In:Sn=95 to 80:5 to 20 (standard weight): 4 wt %

Thebove material solution is injected into the gap 4 through the exhausting tip tube 11 and is adhered to the entire surface of the intermediate film 5. Excess material solution is discharged through the exhausting tip tube 11. Then, the double-wall container is heated in order to vaporize the solvent, such as acetylacetone, in the material solution, which is subsequently discharged through the tip tube 11. It will be appreciated that the solvent can be vaporized effectively, for example, by heating the double-wall container up to around 190° C.

Following the removal of the solvent, the double-wall container is subjected to a heat treatment, preferably by annealing at a temperature range of about 400° C. to 600° C. If thennealing temperature does not reach thebove range, the drying of the material solution will become insufficient, which makes it difficult to obtain metal oxide (ITO) with a desirable composition. Meanwhile, if the heat temperature is over thebove range, the cost of heat treatment will increase. In addition, such a annealing temperature may surpass the heat-resistant temperature of the inner and the outer glass containers 2 and 3. Therefore, the heat temperature beyond thebove range is not desirable. Thebove heat treatment decomposes acetylacetone complex, forming a metal oxide film, which is a transparent film having a yellow or a yellow green color.

After thebove process, the double-wall container is further subjected to a heat treatment in a reducing atmosphere, for example, in vacuum, in order to enhance the radiant heat preventive capability of the metal oxide film. This process is carried out, for example, by heating the double-wall container in vacuum using a vacuum fired heater. It is applicable that thebove heat treatment is carried out in an atmosphere of an inert gas, such as argon or nitrogen, or a low heat conductive gas, such as argon, krypton, and xenon, having heat conductivity lower than that of air. In case of employing a low heat conductivity gas, the gas can be introduced into the gap 4, where the gas constitutes a heat insulating layer, when the heat treatment is carried out.

The heat temperature of thebove heat treatment is preferably within a range of 400 to 600° C. If thennealing temperature does not reach thebove range, the reduction of the metal oxide film will become insufficient. Meanwhile, if the heat temperature is over thebove range, the cost of heat treatment will increase. In addition, such a heat temperature may surpass the heat-resistant temperature of the inner and the outer glass containers 2, 3. Therefore, the heat temperature beyond the range is not desirable. The heat treatment in a reducing atmosphere reduces the metal oxide film, that is, eliminates any oxygen atoms from the metal oxide, producing the radiant heat preventive film 6 composed of the metal oxide (ITO) having a superior radiant heat insulating capability. The radiant heat preventive film 6 is a transparent film having a black or blue color.

It will be appreciated that the resistivity of the metal oxide film is drastically decreased by thebove heat treatment, so that the resulting radiant heat preventive film 6 has a resistivity far lower than that of the original metal oxide. Therefore, for example, when the resistivity of the metal oxide film is in an order of $10^{-3}$ $\Omega$.cm, the resistivity of the radiant heat preventive film 6 can be set to a value smaller than that of the metal oxide film by one order of magnitude, which is an order of $10^{-4}$ $\Omega$.cm. On the other hand, the carrier concentration of the radiant heat preventive film 6 becomes extremely higher than that of the pre-treatment metal oxide film. Therefore, for example, when the carrier concentration of the metal oxide film is in an order of $10^{19}$ $cm^{-3}$, the carrier concentration of the radiant heat preventive film 6 can be set to an order of $10^{20}$ to $10^{21}$ $cm^{-3}$.

Reflection of electromagnetic wave on a metal film occurs when free electrons in the metal film move under the influence of an alternating electric field. As a result, the more, or the freer, the free electrons in the film are, the stronger the reflection capacity of the film for reflecting the electromagnetic wave is. Therefore, lower resistivity and increased carrier concentration of the radiant heat preventive film 6 contributes to the improvement of a radiant heat insulation effect.

As described before, the flaw 2c formed on the surface of the inner glass container 2 or the outer glass container 3 is filled with the intermediate film material so that the strength of the flawed part is enhanced in the inner and the outer containers 2, 3. Therefore, though an internal stress is produced in the inner and the outer glass containers 2 and 3 upon carrying out thebove heat treatment, due to the expansion volume difference or shrinkage volume difference between the intermediate film 5 (or radiant heat preventive film 6) and the inner and the outer glass containers 2 and 3, it becomes difficult for the internal stress to concentrate on the flaw 2c because the strength of the container has been enhanced on the flaw 2c.

Finally, the gap 4 is made vacuum and the exhausting tip tube 11 is sealed. Or, it is also applicable to introduce a low heat conductivity gas, such as argon, krypton, and xenon, into the gap 4 and seal the exhausting tip tube 11. Thus, with the processes described heretofore, the heat insulating container 1 of the present invention is obtained.

In the heat insulating container 1 of this embodiment, the radiant heat preventive film 6 is formed on the outer surface 2a of the inner glass container 2 and the inner surface 3a of the outer glass container 3 with the intermediate film containing $SiO_2$ in between This constitution has the following advantages.

(1) By forming the intermediate film 5, the intermediate film material fills up a flaw formed on the surface of the inner glass container 2 or the outer glass container 3, so that the strength of the glass containers 2, 3 on the flaw is enhanced. Therefore, even if the flaw is formed on the surface of the glass container 2 or 3, it is possible to prevent an internal stress, which is produced by a thermal expansion or shrinkage during the manufacture of the heat insulating container, from acting on the flaw. Thus, breaking up of the inner and outer glass containers 2, 3 can be prevented. Also, when the contents having a lower temperature or higher than that of the inner and outer glass containers 2 and 3 are housed in the container, it is possible to prevent an internal stress produced by a thermal expansion or shrinkage from acting on the flaw in a concentrated manner. Thus, breaking up of the inner and outer glass containers 2, 3, particularly the inner glass container 2, can be prevented. Particularly, since the intermediate film 5 and the radiant heat preventive film 6 are formed on the surface 2a of the inner glass container 2, breaking up of the inner glass container 2 can be surely prevented when contents having a high or low temperature are housed in the container.

(2) Because the strength of the inner and outer glass containers 2, 3 on the flaw is enhanced, therefore it is possible to prevent a stress, which is applied on both containers by the pressure difference between the gap and the outside space, from acting on the flaw in a concentrated manner when the gap is made vacuum. Therefore, breaking up of the glass containers 2, 3 can be effectively prevented.

(3) With the intermediate film 5 formed, metal ion, such as Na ion, is prevented from diffusing and migrating from the inner and outer glass containers 2, 3 to the radiant heat preventive film 6 even if a material containing large amount of metal ion, such as soda glass, is used for both glass containers 2, 3. As a result, the decrease of the carrier concentration of the radiant heat preventive film 6 is prevented, thus, the reduction of its radiant heat insulating capability is prevented.

(4) The flaw formed on the inner or the outer glass containers 2, 3 is filled with the intermediate film material containing $SiO_2$ so that the flaw is difficult to be seen. This is because that the reflection factor difference between the glass containers 2, 3 and the intermediate film 5 containing $SiO_2$ is small. Therefore, the heat insulating container 1 with a superior appearance can be obtained.

(5) The radiant heat preventive film 6 is composed of more than one or more than one compounds selected from a group consisting of ITO ($In_2O_3$—$SnO_2$) ATO ($Sb_2O_3$—$SnO_2$) IZO ($In_2O_3$—$ZnO$), AZO ($Al_2O_3$—$ZnO$), GZO ($GaO_2$—$ZnO$), FTO ($F_2$—$SnO_2$) FZO ($F_2$—$ZnO$). This selection of the compounds makes the radiant heat preventive film 6 excellent in its light permeability. Therefore, the contents of the containers can be visible from the outside.

(6) A metal film, such as a silver film, conventionally used as a radiant heat preventive film has a high heat conductivity. When such a radiant heat preventive film is arranged near the opening ends of the inner and outer containers, the heat inside the containers escapes outside by heat conduction, which may deteriorates the heat insulating capability of the containers. On the other hand, in the heat insulating container 1, the radiant heat preventive film 6 is composed of more than one or more than one compounds selected from a group consisting of $In_2O_3$—$SnO_2$ $Sb_2O_3$—$SnO_2$ $In_2O_3$—$ZnO$, $Al_2O_3$—$ZnO$, $GaO_2$—$ZnO$, $F_2$—$SnO_2$ $F_2$—$ZnO$, so that the heat conductivity of the radiant heat preventive film 6 can be lowered. Therefore, even when the radiant heat preventive film 6 is arranged near the opening ends 2b, 3b of the inner and outer containers 2, 3, the deterioration of heat insulating capacity due to heat conduction can be prevented. Thus, radiant heat can be sufficiently prevented near the opening ends 2b, 3b, so that heat insulating capacity can be improved.

It will be recognized that while thebove embodiment represents an example that the intermediate film 5 and the radiant heat preventive film 6 are formed on the outer surface 2a of the inner glass container 2 and the inner surface 3a of the outer glass container 3, a heat insulating container presented by the invention is not limited to the one described by thebove example. Such a constitution can be also adopted that the intermediate film 5 and the radiant heat preventive film 6 are formed on at least either of the outer surface of the inner glass container 2 or the inner surface of the outer glass container 3. In addition, a method of forming the intermediate film 5 and the radiant heat preventive film 6 is not limited to the sol-gel method. The vapor deposition method or the sputtering method can also be employed.

The heat insulating container of the present invention is provided with the radiant heat preventive film 6 containing metal oxide. The heat preventive film 6 is formed on at least either of the outer surface 2a of the inner glass container 2 or the inner surface of the outer glass container 3 with the intermediate film containing $SiO_2$ formed there between. Thebove insulating container has the following advantageous effects.

(1) By forming the intermediate film 5, the intermediate film material fills up a flaw formed on the surface of the inner glass container 2 or the outer glass container 3, so that the strength of the containers 2, 3 on the flaw is enhanced. Therefore, even if the flaw is formed on the surface of the inner or the outer glass containers 2, 3, it is possible to prevent an internal stress, which is produced by a thermal expansion or shrinkage during the manufacture of the heat insulating container, from acting on the flaw in a concentrated manner. Thus, breaking up of the inner and the outer glass containers 2, 3, can be effectively prevented. Also, when contents with a temperature lower or higher than that of the inner and the outer containers are housed in the container, it is possible to prevent an internal stress produced by a thermal expansion or shrinkage from acting on the flaw in a concentrated manner. Thus, breaking up of the inner and the outer glass containers 2, 3, particularly the inner glass container 2, can be prevented. Particularly, since the intermediate film 5 and the radiant heat preventive film 6 are formed on the surface of the inner glass container 2, breaking up of the inner glass container 2 can be surely prevented when contents with a high or low temperature are housed in the heat insulating container.

(2) Because the strength of the inner and the outer glass containers 2, 3, on the flaw is enhanced, therefore it is possible to prevent a stress, which is applied on both inner and outer glass containers 2, 3, by the pressure difference between the gap and the outside space, from acting on the flaw in a concentrated manner when the gap is made vacuum. Therefore, breaking up of the inner and outer glass containers 2, 3, can be effectively prevented.

(3) With the intermediate film 5 formed, metal ion, such as Na ion, is prevented from diffusing and migrating from the inner and the outer glass containers 2 and 3 to the radiant heat preventive film 6 even if the material contains a large amount of metal ion, such as soda glass, is used for both glass containers. As a result, the decrease of the carrier concentration of the radiant heat preventive film is prevented, thus, the decrease of its radiant heat insulating capability is prevented.

(4) The radiant heat preventive film 6 is composed of more than one or more than one compounds selected from a group consisting of $In_2O_3$—$SnO_2$, $Sb_2O_3$—$SnO_2$, $In_2O_3$—ZnO, $Al_2O_3$—ZnO, $GaO_2$—ZnO, $F_2$—$SnO_2$, $F_2$—ZnO, so that the heat conductivity of the radiant heat preventive film 6 can be lowered. Therefore, even when the radiant heat preventive film 6 is arranged near the opening ends of the inner and the outer glass containers, the deterioration of heat insulating capacity due to heat conduction can be effectively prevented. Thus, radiant heat can be sufficiently prevented near the opening ends, so that heat insulating capacity can be improved.

While the present invention has been described with a preferred embodiment, this description is not intended to limit our invention. Various modifications of the embodiment will be apparent to those skilled in thert. It is therefore contemplated that theppended claims will cover any such modifications or embodiments as fall within the true scope of the invention.

What is claimed is:

1. A heat insulating container having an inner glass container housed in an outer glass container with a gap formed in-between, said gap constituting a heat insulating layer, wherein a radiant heat preventive film containing metal oxide is formed on at least either of an outer surface of the inner glass container or an inner surface of the outer glass container with an intermediate film containing $SiO_2$ disposed in between the outer surface of the inner glass container and the radiant heat preventive film or in between the inner surface of the outer glass container and the radiant heat preventive film.

2. The heat insulating container of claim 1, wherein the intermediate film is formed by a sol-gel method.

3. The heat insulating container of claim 1, wherein the radiant heat preventive film is composed of more than one or more than one compounds selected from a group consisting of $In_2O_3$—$SnO_2$, $Sb_2O_3$—$SnO_2$, $In_2O_3$—ZnO, $Al_2O_3$—ZnO, $GaO_2$—ZnO, $F_2$—$SnO_2$, $F_2$—ZnO.

4. The heat insulating container of claim 1, wherein the intermediate film and the radiant heat preventive film are at least formed on the outer surface of an inner glass container.

5. The heat insulating container of claim 1, wherein a softening temperature of a glass constituting the inner and the outer glass containers is about 500° C. or higher than 500° C.

6. The heat insulating container of claim 1, wherein the gap is formed in an airtight manner.

* * * * *